United States Patent [19]

Tanaka et al.

[11] Patent Number: 5,123,086
[45] Date of Patent: Jun. 16, 1992

[54] METHOD AND SYSTEM OF HIERARCHICAL ASSISTANCE

[75] Inventors: Atsushi Tanaka, Tokyo; Yoshinori Kishimoto, Kawasaki; Takeshi Chusho, Yokohama, all of Japan

[73] Assignee: Hitachi, Ltd., Tokyo, Japan

[21] Appl. No.: 151,447

[22] Filed: Feb. 2, 1988

[30] Foreign Application Priority Data

Feb. 6, 1987 [JP] Japan ................................ 62-26108

[51] Int. Cl.$^5$ .................................... G06F 15/403
[52] U.S. Cl. .................................... 395/155; 395/118; 395/600; 364/283.3; 364/282.1; 364/286.0; 364/948.2
[58] Field of Search ................................ 364/200, 900

[56] References Cited

U.S. PATENT DOCUMENTS

| | | | |
|---|---|---|---|
| 4,593,379 | 6/1986 | Fourcade | 364/900 |
| 4,620,276 | 10/1986 | Daniell | 364/200 |
| 4,860,247 | 8/1989 | Uchida et al. | 364/900 |

OTHER PUBLICATIONS

Alfred V. Aho and Jeffrey D. Ullman, "Principles of Compiler Design", Apr., 1979, pp. 82-85, pp. 124-144.

*Primary Examiner*—Gareth D. Shaw
*Assistant Examiner*—Maria N. Von Buhr
*Attorney, Agent, or Firm*—Fay, Sharpe, Beall, Fagan, Minnich & McKee

[57] ABSTRACT

The system providing a guidance for the command entry to an interactive computer recognizes the hierarchical rank of productions and displays command explanatory messages below the rank of production to which the command in need of explanation belongs. Displaying commands of one or two ranks relieves the operator from the annoyance of useless display reading.

12 Claims, 7 Drawing Sheets

F I G. 2
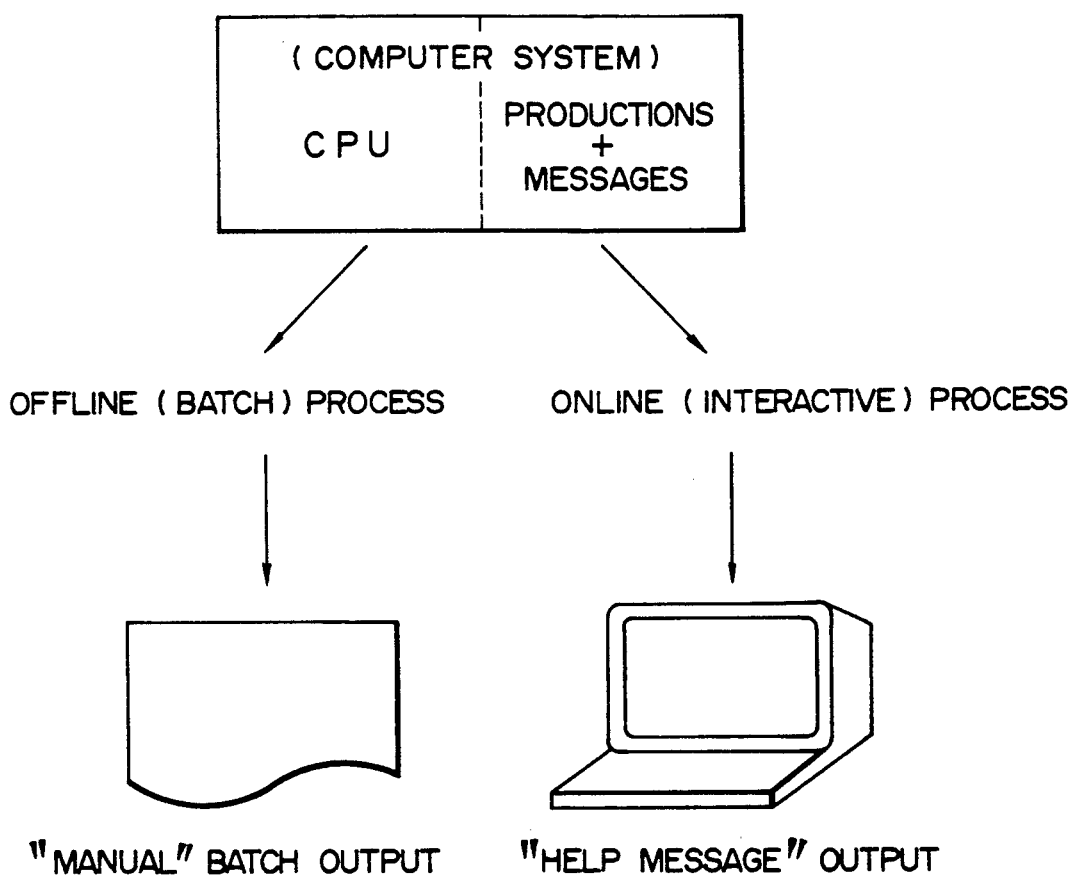

FIG. 3

| | | STEP NUMBER |
|---|---|---|
| <STATEMENT>→<ASSIGN> | | 1 |
| <STATEMENT>→<REPEAT> | | 2 |
| <STATEMENT>→<IF> | | 3 |
| <STATEMENT>→<BEGIN> | | 4 |
| <ASSIGN> | →<ID>:=<EXPRESSION>; | 5 |
| <REPEAT> | →FOR <CONDITION> DO <STATEMENT>; | 6 |
| <IF> | →IF <CONDITION> THEN <STATEMENT>; | 7 |
| | ELSE <STATEMENT>; | 8 |
| <BEGIN> | →BEGIN <STATEMENT> END; | 9 |
| <STATEMENT> | =' A SENTENCE TO DESCRIBE A PROCESS THERE ARE FOUR CASES'; | |
| <ASSIGN> | =' SUBSTITUTE RESULT OF RIGHT SIDE INTO VARIABLE ON LEFT SIDE'; | 11 |
| <REPEAT> | =' REPEAT STRINGS OF SAME SENTENCE UNTIL SPECIFIED CONDITION IS MET'; | 12 |
| <IF> | =' SELECT A SENTENCE TO BE EXECUTED DEPENDING ON SPECIFIED CONDITION'; | 13 |
| <BEGIN> | ='EXECUTE A SERIES OF A SENTENCE SEQUENTIALLY'; | 14 |
| ⋮ | | |

FIG. 4

| | STEP NUMBER |
|---|---|
| <STATEMENT> | 1 |
| A SENTENCE TO DESCRIBE A PROCESS | 2 |
| THERE ARE FOUR CASES | 3 |
| (1) <ASSIGN> | 4 |
|     SUBSTITUE RESULT OF RIGHT SIDE INTO VARIABLE ON LEFT SIDE | |
| (2) <REPEAT> | 5 |
|     REPEAT STRINGS OF THE SAME SENTENCE UNTIL SPECIFIED CONDITION IS MET | |
| (3) <IF> | 6 |
|     SELECT A SENTENCE TO BE EXECUTED DEPENDING ON SPECIFIED CONDITION | |
| (4) <BEGIN> | 7 |
|     EXECUTE A SERIES OF SENTENCES SEQUENTIALLY | |

FIG. 5

| | STEP NUMBER |
|---|---|
| <ASSIGN> —<ID> : —<EXPRESSION> ; | 1 |
| <EXPRESSION>—<ID> | 2 |
| <EXPRESSION>—<EXPRESSION> + <EXPRESSION> | 3 |
| <EXPRESSION>—<EXPRESSION> - <EXPRESSION> | 4 |
| <EXPRESSION>—<EXPRESSION> * <EXPRESSION> | 5 |
| <EXPRESSION>—<EXPRESSION> / <EXPRESSION> | 6 |
| <ASSIGN> = 'SUBSTITUTE RESULT OF RIGHT SIDE INTO VARIABLE ON LEFT SIDE'; | 7 |
| <ID> = 'A VARIABLE NAME', 'e.g.: ABC、AI、A10B --- ALLOWED  1AB、AB --- DISALLOWED'; | 8 |
| <EXPRESSION> = 'AN OPERATIONAL EXPRESSION THERE ARE FIVE CASES'; | |
| <EXPRESSION> $1 —'A SIMPLE OPERATIONAL EXPRESSION'; | 10 |
| <EXPRESSION> $2 —'ADDITION BETWEEN OPERATIONAL EXPRESSIONS'; | 11 |
| <EXPRESSION> $3 —'SUBTRACTION BETWEEN OPERATIONAL EXPRESSIONS'; | 12 |
| <EXPRESSION> $4 —'MULTIPLICATION BETWEEN OPERATIONAL EXPRESSIONS'; | 13 |
| <EXPRESSION> $5 —'DIVISION BETWEEN OPERATIONAL EXPRESSIONS'; | 14 |

FIG. 6

|  | STEP NUMBER |
|---|---|
| <ASSIGN> | 1 |
|   SUBSTITUTE RESULT OF RIGHT SIDE INTO VARIABLE ON LEFT SIDE | 2 |
| <ID> : = <EXPRESSION> | 3 |
| <ID> | 4 |
|   A VARIABLE NAME | 5 |
|   e.g.: ABC、AI、A10B --- ALLOWED<br>       1AB、.AB       --- DISALLOWED | |
| <EXPRESSION> | 6 |
|   AN OPERATIONAL EXPRESSION | 7 |
|   THERE ARE FIVE CASES | 8 |
| (1)<ID> | 9 |
|     A SIMPLE OPERATIONAL EXPRESSION | |
| (2)<EXPRESSION> + <EXPRESSION> | 10 |
|     ADDITION BETWEEN OPERATIONAL EXPRESSIONS | |
| (3)<EXPRESSION> - <EXPRESSION> | 11 |
|     SUBTRACTION BETWEEN OPERATIONAL EXPRESSIONS | |
| (4)<EXPRESSION> * <EXPRESSION> | 12 |
|     MULTIPLICATION BETWEEN OPERATIONAL EXPRESSIONS | |
| (5)<EXPRESSION> / <EXPRESSION> | 13 |
|     DIVISION BETWEEN OPERATIONAL EXPRESSIONS | |

METHOD AND SYSTEM OF HIERARCHICAL ASSISTANCE

BACKGROUND OF THE INVENTION

This invention relates to the improvement of a help message output method for assisting the user's interactive operation with a computer by using the computer's internal data, specifically productions and messages which will be described below.

A method of providing a help message in response to the request of a computer user generally issues a help message by specifying a command name intended for help in the operand of the help command, as in a help function for commands in a time sharing system (TSS). This method displays all help messages at once for items needing help. The above-mentioned method provides information needed by the user, but also provides unneedful information at the same time.

SUMMARY OF THE INVENTION

An object of this invention is to provide a help message output system which does not oblige the user to read all help messages for the acquisition of necessary information.

Another object of this invention is to solve the foregoing problem of the conventional method and provide a system capable of offering help messages which are easily recognizable by the user.

A further object of this invention is to provide a help message output method which is intended to guarantee an appropriate amount of operational instructions in a complex interactive processing system.

The above objectives of this invention are attained by the hierarchical assistance method for an interactive computer system which receives an input from a terminal and implements a process based on the input, wherein the assistance method features to display a table of syntactic elements, which can be entered, in order from the highest ranking production by utilizing productions which have been defined hierarchically using syntactic element strings and their relations, and issues a detailed help message for each item using the messages defined in the above-mentioned productions in prompting the operator to select an input item. By deleting productions which are not essential for the assistance in the above-mentioned productions, help messages at a plurality of stages can be output at a time.

By utilizing the productions defined at multiple stages using the syntactic element strings and their relations to display a table of syntactic elements, which can be entered, in order from the highest ranking production, it is also possible to output in batch all help messages following the syntactic element specified by the operator.

BRIEF DESCRIPTION OF THE DRAWINGS

FIG. 2 is a diagram showing the overall system to which this invention is applied;

FIG. 3 is a diagram showing an example of the appendage of help messages to productions;

FIG. 4 is a diagram showing the result of execution of the hierarchical assistance by the example of FIG. 3;

FIG. 5 is a diagram showing an example of addition of productions which are unnecessary for the assistance; and FIG. 6 is a diagram showing the result of execution of the hierarchical assistance by the example of FIG. 5.

DESCRIPTION OF THE PREFERRED EMBODIMENTS

Figure 1A:
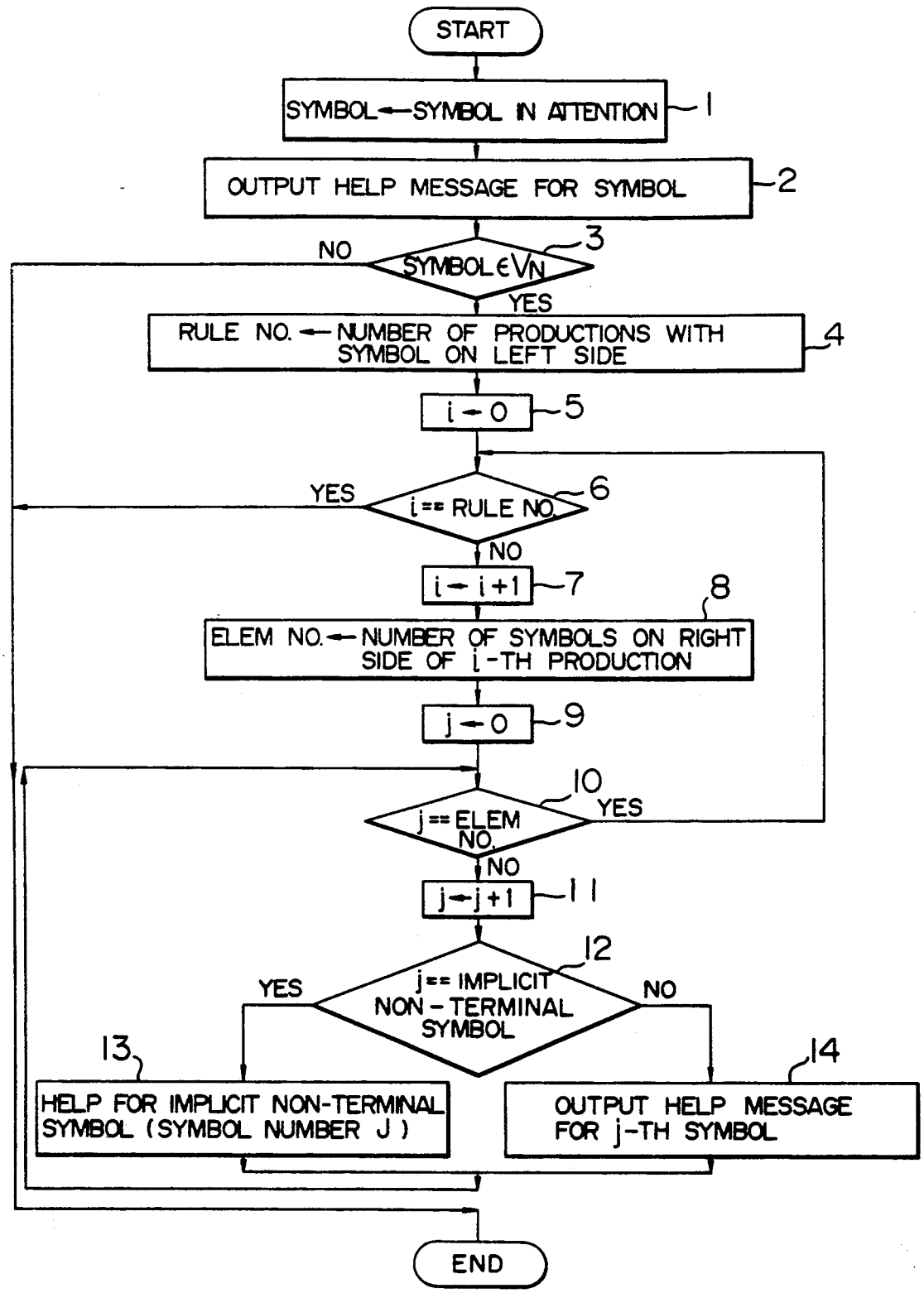
FIGS. 1A and 1B are flowcharts showing the procedure of the hierarchical assistance method embodying the present invention.

Syntax analysis, productions, terminal symbols and non-terminal symbols are described in the publication A.V. Aho et al., Principles of Compiler Design, pp. 82-85, 125-144, Addison-Wesley, 1977.

As a method of describing the interactive procedure, the following method of formal definition of grammar is used. The alphabet is assumed to be a non-empty finite set, and its elements are called "symbols". An arbitrary number of strings of symbols which belong to one alphabet are called "strings".

Descriptions of syntax rules are called "productions", and they are described as follows.

$$U \rightarrow X \tag{1}$$

where U represents a symbol and X represents a string. U is called the left side of production and X is called the right side of production. This production reads "symbol U consists of string X".

When a set of productions is called P, symbols appearing on the left side of productions are called non-terminal symbols ($V_N$) and symbols appearing only on the right side of productions are called terminal symbols ($V_T$), then grammar G is defined, with S being a start symbol ($S \in V_N$), as follows.

$$G = \{P, S, V_N, V_T\} \tag{2}$$

The grammar G will be written as follows.

$$G(P, S, V_N, V_T) \tag{3}$$

Here, HELP(A) is introduced.

$$HELP(A) = \{a \mid A \rightarrow a, A \in V_N, a \in V^*\} \tag{4}$$

where the symbol * means the closure.

The productions are assumed to be defined as follows.

$$Z \rightarrow X A Y (X, Y \in V^*)$$
$$A \rightarrow a_1$$
$$A \rightarrow a_2$$
$$\ldots$$
$$A \rightarrow a_n \ (a_i \in V^*)$$

In the input induction state $Z \rightarrow X \cdot A\ Y$, where the symbol · means the state for inputting A, when the user requests assistance (asks the system for help), the above HELP(A) is displayed as a help message. We call this method to be a hierarchical assistance method.

In the above-mentioned hierarchical assistance method, help messages are produced simply from productions. Accordingly, all symbols in productions are objects of assistance, however, in productions, there are symbols which have been introduced solely for making the syntax analysis possible and help for these symbols are meaningless for the user.

Non-terminal symbols $V_N$ are classified into symbols for which the system automatically executes the hierarchical assistance and symbols which terminate the hierarchical assistance. We call the former "implicit non-terminal symbols ($V_{IN}$)" and the latter "explicit non-terminal symbols ($V_{EN}$)".

$$V_N = V_{IN} \cup V_{EN}$$

where $V_{IN} \cap V_{EN} = \phi$

Namely, in executing HELP(A) in the above input induction state, HELP(X) is also implemented automatically for a symbol X which meets the following conditions.

$$\{X | A \rightarrow a\ X\ b,\ X \epsilon V_{IN}, a, b \epsilon V^*\}$$

Accordingly, the inventive assistance method is useful for the command input, data input and program input prompt in an interactive computer system as shown in FIG. 2. It is also applicable to the input prompt in application programs such as a cash dispenser in a bank online system or to the help function in programming systems.

It is assumed that a help message is defined as follows. Namely, a non-terminal symbol name or terminal symbol name used for describing a production is put on the left side, and the message main body enclosed by quotation marks is put on the right side.

Figure 1B:
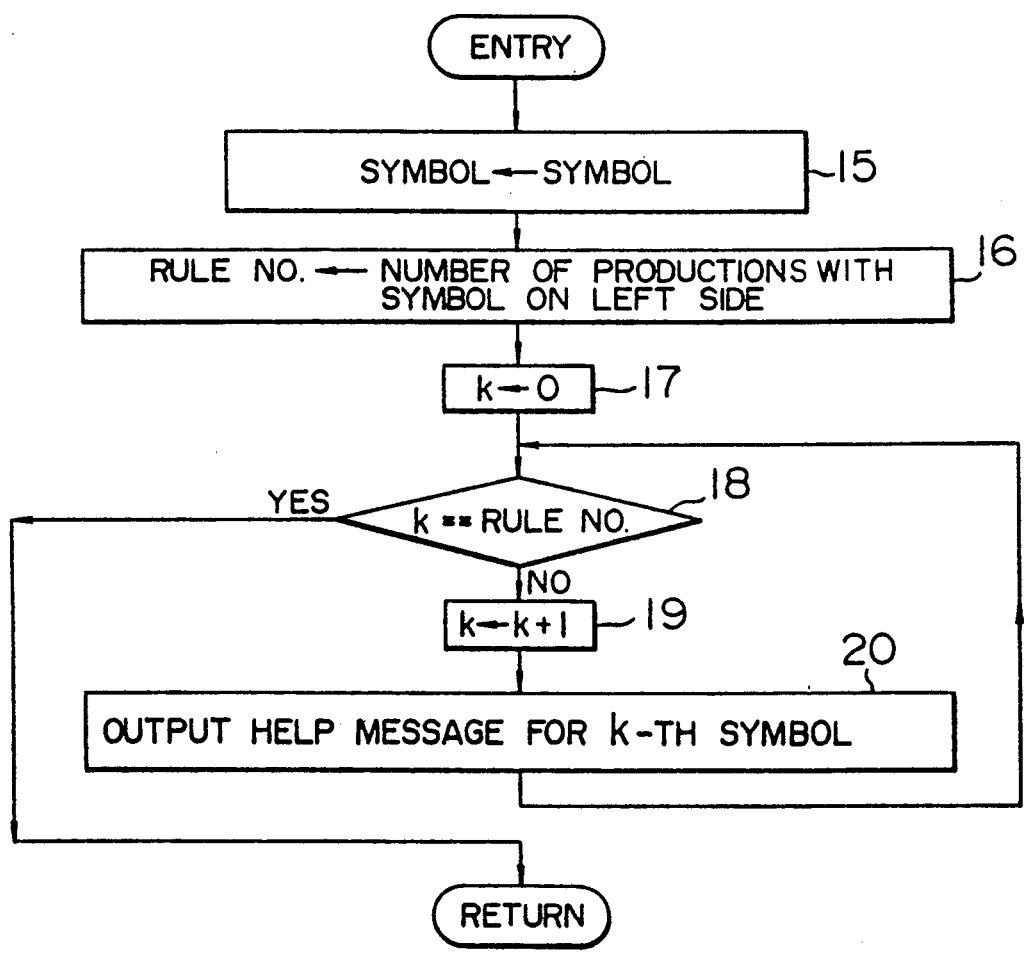

The procedure of the hierarchical assistance method using the above definition will be explained using FIGS. 1A and 1B.

From step 1 to step 14 is the main body of this procedure, and from step 15 to step 20 is a subsidiary procedure called by the main body.

Step 1 substitutes a symbol which is currently in attention into variable Symbol.

Step 2 outputs the help message defined for the Symbol.

Step 3 checks whether Symbol is a non-terminal symbol. The flow terminates when it is a non-terminal symbol, or if it is not a non-terminal symbol, the sequence proceeds to step 4.

Step 4 substitutes the number of productions, having their left side being Symbol, into variable Rule NO.

Step 5 sets counter i to "0".

Step 6 checks whether the counter i and Rule NO. are equal. The sequence terminates if they are equal, otherwise the sequence proceeds to step 7.

Step 7 increments the counter i by "1".

Step 8 substitutes the number of symbols existing on the right side of the i-th production into variable Elem NO.

Step 9 sets counter j to "0".

Step 10 checks whether the counter j and Elem NO. are equal. If they are equal, the sequence returns to step 6, otherwise the sequence proceeds to step 11.

Step 11 increments the counter j by "1".

Step 12 checks whether the j-th symbol is an implicit non-terminal symbol. If it is so, the sequence proceeds to step 13, otherwise the sequence proceeds to step 14.

Step 13 executes the subsidiary procedure "assistance of implicit non-terminal symbol" using the j-th symbol as an argument, and the sequence returns to step 10.

Step 14 outputs the help message defined for the j-th symbol, and the sequence returns to step 10.

The subsidiary procedure "assistance of implicit non-terminal symbol" implements the following process. The symbol number in step 13 corresponds to the symbol in step 15.

Step 15 substitutes a symbol which is currently in attention into variable Symbol.

Step 16 substitutes the number of productions, with their left side being Symbol, into variable Rule NO.

Step 17 sets counter k to "0".

Step 18 checks whether the counter k and Rule NO. are equal. If they are equal, the sequence returns, otherwise it proceeds to step 19.

Step 19 increments the counter k by "1".

Step 20 outputs the help message defined for the k-th symbol, and the sequence returns to step 18.

The hierarchical assistance method will be explained using a specific example of definition of production.

FIG. 3 shows the example of definition of production with help messages appended thereto. Assuming S to be a start symbol, this is relevant to the case of help request in a state of S→ ... <statement> ...

Steps 1 through 9 at the right end are the definition of production. Steps 10 through 14 define messages for individual symbols.

FIG. 4 shows an example of a help message output for the production of FIG. 3 with the symbol currently in attention being the <statement>.

Steps 1 through 3 in FIG. 4 are the help messages defined in step 10 in FIG. 3 and outputted in step 2 in FIG. 1, and steps 4 through 7 in FIG. 4 are the help messages defined in steps 11 through 14 in FIG. 3 and outputted in step 12 in FIG. 1.

The foregoing embodiment outputs only necessary information as help messages, preventing the user to read the whole lengthy message up to the end, as in conventional systems.

Generally, in defining production, non-terminal symbols unneedful for the assistance are often introduced in consideration of the easiness of reading and writing productions and in consideration of the possibility of syntax analysis. In such a case, the use of the foregoing hierarchical assistance method compels the user to have a useless assistance in acquiring necessary information. On this account, such symbols are treated as non-terminal symbols and a hierarchical assistance further lower by one rank is executed automatically. An example of this case will be explained using FIGS. 5 and 6.

Steps 1 through 6 in FIG. 5 define productions, and steps 7 through 14 define help messages for individual symbols. $n (n=1, 2, ...) appearing on the left side of steps 10 through 14 are to identify productions having the same non-terminal symbols on the left side. It is assumed here that non-terminal symbols <expression> and <id> are declared to be implicit non-terminal symbols.

FIG. 6 shows an example of a help message output for the productions of FIG. 5, with the symbol currently in attention being <assign>. Steps 1 through 3 in FIG. 6 are the help message defined in step 7 of FIG. 5 and outputted in step 2 in FIG. 1.

Steps 4 and 5 in FIG. 6 are the help message defined in step 8 in FIG. 5 and outputted in step 2 in FIG. 1. Steps 6 through 8 are the help messages defined in step 9 in FIG. 5 and outputted in step 2 in FIG. 1. Steps 9 through 13 are the help messages defined in steps 10 through 14 in FIG. 5 and outputted in the loop of steps 18 through 20 in FIG. 1. Thus, the message of FIG. 6 has more information than that of FIG. 4 with regard to the symbols in the productions in correspondence to the additional one rank.

We claim:

1. A method of hierarchical assistance executed by a data processing device, for operator interaction with the data processing device using productions and help messages stored in an internal memory of the device, the method comprising the steps of:
   receiving an input query from an associated input device in electrical communication with the data processing device as a symbol in attention;
   storing the received symbol in attention into a memory location of the internal memory as a variable SYMBOL;
   outputting a help message predefined for the symbol in attention to an output device in electrical communication with said data processing device;
   determining whether the variable SYMBOL is a non-terminal symbol;
   storing, in the memory, a variable RULE NUMBER comprising an count of productions stored in the memory having the variable SYMBOL as their respective object arguments;
   initializing a first count value stored in a first counter to a first counter initial value;
   comparing the first count value with the variable RULE NUMBER:
   incrementing the first count value if the first count value does not match the variable RULE NUMBER;
   storing, in the memory, a variable ELEMENT NUMBER comprising a count value of symbols within a first production stored in the memory;
   initializing a second count value stored in a second counter to a second counter initial value;
   comparing the second count value with the variable ELEMENT NUMBER;
   incrementing the second count value if the second count value does not match the variable ELEMENT NUMBER;
   determining whether a SECOND COUNT VALUE$^{th}$ symbol of the first production is an implicit non-terminal symbol, and;
   outputting, to said output device in electrical communication with said data processing device, a help message defined for the SECOND COUNT VALUE$^{th}$ symbol of the first production to an associated output device when the SECOND COUNT VALUE$^{th}$ symbol of the first production is not an implicit non-terminal symbol.

2. The method of hierarchical assistance of claim 1 further comprising the step of terminating the hierarchical assistance when the variable SYMBOL is determined to be a terminal symbol.

3. The method of hierarchical assistance of claim 1 further comprising the step of terminating the hierarchical assistance when the variable RULE NUMBER matches the first count value.

4. The method of hierarchical assistance of claim 1 further comprising the step of comparing the first count value with the variable RULE NUMBER when the second count value matches the variable ELEMENT NUMBER.

5. The method of hierarchical assistance of claim 1 further comprising the steps of:
   storing, in the memory, a variable RULE NUMBER comprising a count value of productions stored in the memory having the variable SYMBOL as an object argument of each respective production equation;
   initiating a third count value stored in a third counter to a third counter initial value;
   comparing the third count value with the variable RULE NUMBER;
   incrementing the third count value if the third count value does not match the variable RULE NUMBER, and;
   outputting a help message defined for the THIRD COUNT VALUE$^{th}$ symbol of the first production to an associated output device.

6. The method of hierarchical assistance of claim 4 further comprising the step of comparing the second count value with the variable ELEMENT NUMBER when the third count value matches the variable RULE NUMBER.

7. A hierarchical assistance system for operator interaction using productions and help messages stored in an internal memory, the hierarchical assistance system comprising:
   means for receiving an input query from an associated terminal device as a symbol in attention;
   means for storing the received symbol in attention into a memory location of the internal memory as a variable SYMBOL;
   means for outputting a help message predefined for the symbol in attention;
   means for determining whether the variable SYMBOL is a non-terminal symbol;
   means for storing, in the memory a variable RULE NUMBER comprising a count of productions stored in the memory having the variable SYMBOL as an object argument;
   means for initiating a first count value stored in a first counter to a first counter initial value;
   means for comparing the first count value with the variable RULE NUMBER;
   means for incrementing the first count value if the first count value does not match the variable RULE NUMBER;
   means for storing, in the memory, a variable ELEMENT NUMBER comprising a count value of symbols within a first production stored in the memory;
   means for initializing a second count value stored in a second counter to a second counter initial value;
   means for comparing the second count value with the variable ELEMENT NUMBER;
   means for incrementing the second count value if the second count value does not match the variable ELEMENT NUMBER;
   means for determining whether a SECOND COUNT VALUE$^{th}$ symbol of the first production is an implicit non-terminal symbol, and;
   means for outputting a help message defined for the SECOND COUNT VALUE$^{th}$ symbol of the first production to an associated output device when the SECOND COUNT VALUE$^{th}$ symbol of the first production is not an implicit non-terminal symbol.

8. The hierarchical assistance system of claim 7 further comprising means for terminating the hierarchical assistance when the variable SYMBOL is determined to be a terminal symbol.

9. The hierarchical assistance system of claim 7 further comprising means for terminating the hierarchical assistance when the variable RULE NUMBER matches the first count value.

10. The hierarchical assistance system of claim 7 further comprising means for comparing the first count value with the variable RULE NUMBER when the second count value matches the variable ELEMENT NUMBER.

11. The hierarchical assistance system of claim 7 further comprising:
   means for storing, in the memory, a variable RULE NUMBER comprising a count value of productions stored in the memory having the variable SYMBOL as an object argument of each respective production equation;
   means for initializing a third count value stored in a third counter to a third counter initial value;
   means for comparing the third count value with the variable RULE NUMBER;
   means for incrementing the third count value if the third count value does not match the variable RULE NUMBER, and;
   means for outputting a help message defined for the THIRD COUNT VALUE$^{th}$ symbol of the first production to an associated output device.

12. The hierarchical assistance system of claim 11 further comprising means for comparing the second count value with the variable ELEMENT NUMBER when the third count value matches the variable RULE NUMBER.

* * * * *

UNITED STATES PATENT AND TRADEMARK OFFICE
CERTIFICATE OF CORRECTION

PATENT NO. : 5,123,086

DATED : June 16, 1992

INVENTOR(S) : Atsushi Tanaka, et al.

It is certified that error appears in the above-identified patent and that said Letters Patent is hereby corrected as shown below:

Claim 1, column 5, line 18, delete "an" and replace with --a--.

Claim 5, column 6, line 1, delete "initiating" and replace with --initializing--.

Claim 7, column 6, line 33, delete "initiating" and replace with --initializing--.

Signed and Sealed this

Twentieth Day of July, 1993

Attest:

MICHAEL K. KIRK

Attesting Officer

Acting Commissioner of Patents and Trademarks